United States Patent
Urias et al.

(10) Patent No.: US 11,677,668 B1
(45) Date of Patent: Jun. 13, 2023

(54) TRANSPARENT APPLICATION-LAYER/OS DEEPER PACKET INSPECTOR

(71) Applicant: National Technology & Engineering Solutions of Sandia, LLC, Albuquerque, NM (US)

(72) Inventors: Vincent Urias, Albuquerque, NM (US); Brian P. Van Leeuwen, Albuquerque, NM (US); William M. S. Stout, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 71 days.

(21) Appl. No.: 17/401,211

(22) Filed: Aug. 12, 2021

Related U.S. Application Data

(60) Provisional application No. 63/072,819, filed on Aug. 31, 2020.

(51) Int. Cl.

| | | |
|---|---|---|
| *H04L 47/2441* | (2022.01) | |
| *H04L 47/2483* | (2022.01) | |
| *H04L 43/028* | (2022.01) | |
| *H04L 43/026* | (2022.01) | |
| *H04L 47/31* | (2022.01) | |
| *H04L 43/18* | (2022.01) | |
| *H04L 43/12* | (2022.01) | |

(52) U.S. Cl.
CPC ........ *H04L 47/2441* (2013.01); *H04L 43/026* (2013.01); *H04L 43/028* (2013.01); *H04L 43/12* (2013.01); *H04L 43/18* (2013.01); *H04L 47/2483* (2013.01); *H04L 47/31* (2013.01)

(58) Field of Classification Search
CPC ... H04L 47/2441; H04L 43/18; H04L 43/026; H04L 43/028; H04L 47/2483; H04L 47/31; H04L 43/12
See application file for complete search history.

(56) References Cited

U.S. PATENT DOCUMENTS

| | | | | |
|---|---|---|---|---|
| 6,651,099 | B1 * | 11/2003 | Dietz | G06F 16/90344 |
| | | | | 709/224 |
| 6,665,725 | B1 * | 12/2003 | Dietz | H04L 69/161 |
| | | | | 709/228 |

(Continued)

FOREIGN PATENT DOCUMENTS

| WO | WO-2011051750 A2 * | 5/2011 | ........... H04L 43/026 |
|---|---|---|---|

OTHER PUBLICATIONS

Oracle. "Oracle Communications Session Border Controller and Session Router: VNF Essentials Guide", Release S-CZ7.3.9, Mar. 2018, 56 pages. (Year: 2018).*

*Primary Examiner* — George C Neurauter, Jr.
(74) *Attorney, Agent, or Firm* — Yee & Associates, P.C.

(57) ABSTRACT

A computer-implemented method of deep packet inspection (DPI) in a network is provided. The method comprises collecting data packets comprising a number of traffic flows from a number of devices via a number of traffic taps and classifying each traffic flow according to data about network protocol layers of the packets comprising the traffic flow. Application layer metadata is extracted from the packets. Traffic flow classification data and the extracted metadata are ingested into a data cluster and normalized. The normalized classification data and extracted metadata is then correlated to other data sets.

27 Claims, 7 Drawing Sheets

(56) References Cited

U.S. PATENT DOCUMENTS

| | | | | |
|---|---|---|---|---|
| 7,944,822 B1* | 5/2011 | Nucci | H04L 41/142 |
| | | | 370/229 |
| 8,135,657 B2* | 3/2012 | Kapoor | G06F 9/505 |
| | | | 706/45 |
| 8,311,956 B2* | 11/2012 | Sen | G06N 20/20 |
| | | | 706/12 |
| 9,038,172 B2* | 5/2015 | Miller | H04L 63/0227 |
| | | | 726/22 |
| 9,258,217 B2* | 2/2016 | Duffield | H04L 45/38 |
| 9,578,008 B2* | 2/2017 | Sood | H04L 9/30 |
| 9,800,608 B2* | 10/2017 | Korsunsky | G06F 21/55 |
| 9,843,488 B2* | 12/2017 | Balabine | H04L 63/1458 |
| 10,250,466 B2* | 4/2019 | Pasupathy | H04L 67/02 |
| 10,541,903 B2* | 1/2020 | Wang | H04L 43/0876 |
| 10,545,778 B1* | 1/2020 | Venkata | G06F 11/203 |
| 10,951,495 B2* | 3/2021 | Pasupathy | H04L 47/10 |
| 2011/0040706 A1* | 2/2011 | Sen | G06N 20/00 |
| | | | 706/12 |
| 2016/0359740 A1* | 12/2016 | Parandehgheibi | H04W 84/18 |
| 2018/0131593 A1* | 5/2018 | Jain | H04L 43/10 |
| 2018/0173547 A1* | 6/2018 | Stokes | G06F 8/60 |
| 2019/0042297 A1* | 2/2019 | Connor | G06F 11/3438 |
| 2021/0105228 A1* | 4/2021 | Joseph | H04L 41/147 |
| 2021/0204152 A1* | 7/2021 | Vasudevan | H04L 47/2441 |

* cited by examiner

TRANSPARENT APPLICATION-LAYER/OS DEEPER PACKET INSPECTOR

CROSS-REFERENCE TO RELATED APPLICATION

This application claims the benefit of U.S. Provisional Application No. 63/072,819 filed Aug. 31, 2020, which is incorporated herein by reference.

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to network monitoring, and more specifically to deep packet inspection in secure computer network systems.

2. Description of the Related Art

Current networked systems utilize advanced security components such as Next Generation Firewall (NGFW), Intrusion Detection Systems (IDS), Intrusion Prevention Systems (IPS), and methods for network traffic classification. A fundamental aspect of these security components and methods is network packet visibility and packet inspection. To achieve packet visibility a compute mechanism used by these security components and methods is Deep Packet Inspection (DPI). DPI is used to obtain visibility into packet fields by looking deeper inside packets, beyond just IP address, port, and protocol.

However, DPI is considered extremely expensive in terms of computer processing costs and very challenging to implement on high-speed network systems. Current solutions on the market do not scale well beyond 10 gigabits per second (Gbps) networks. However, 50 Gbps, 100 Gbps, 400 Gbps network interfaces (on a single fiber optic interface) are on the market today. The current solutions only scale by increasing the hardware footprint.

Therefore, it would be desirable to have a method and apparatus that take into account at least some of the issues discussed above, as well as other possible issues.

SUMMARY

An illustrative embodiment provides a computer-implemented method of deep packet inspection (DPI) in a network. The method comprises collecting data packets comprising a number of traffic flows from a number of devices via a number of traffic taps and classifying each traffic flow according to data about network protocol layers of the packets comprising the traffic flow. Application layer metadata is extracted from the packets. Traffic flow classification data and the extracted metadata are ingested into a data cluster and normalized. The normalized classification data and extracted metadata is then correlated to other data sets.

Another illustrative embodiment provides a system for deep packet inspection (DPI) in a network. The system comprises a storage device configured to store program instructions and one or more processors operably connected to the storage device and configured to execute the program instructions to cause the system to: collect data packets comprising a number of traffic flows from a number of devices via a number of traffic taps; classify each traffic flow according to data about network protocol layers of the packets comprising the traffic flow; extract application layer metadata from the packets; ingest traffic flow classification data and the extracted metadata into a data cluster; normalize the ingested classification data and extracted metadata; and correlate the normalized classification data and extracted metadata to other data sets.

Another illustrative embodiment provides a computer program product for deep packet inspection (DPI) in a network. The computer program product comprises a computer-readable storage medium having program instructions embodied thereon to perform the steps of: collecting data packets comprising a number of traffic flows from a number of devices via a number of traffic taps; classifying each traffic flow according to data about network protocol layers of the packets comprising the traffic flow; extracting application layer metadata from the packets; ingesting traffic flow classification data and the extracted metadata into a data cluster; normalizing the ingested classification data and extracted metadata; and correlating the normalized classification data and extracted metadata to other data sets.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
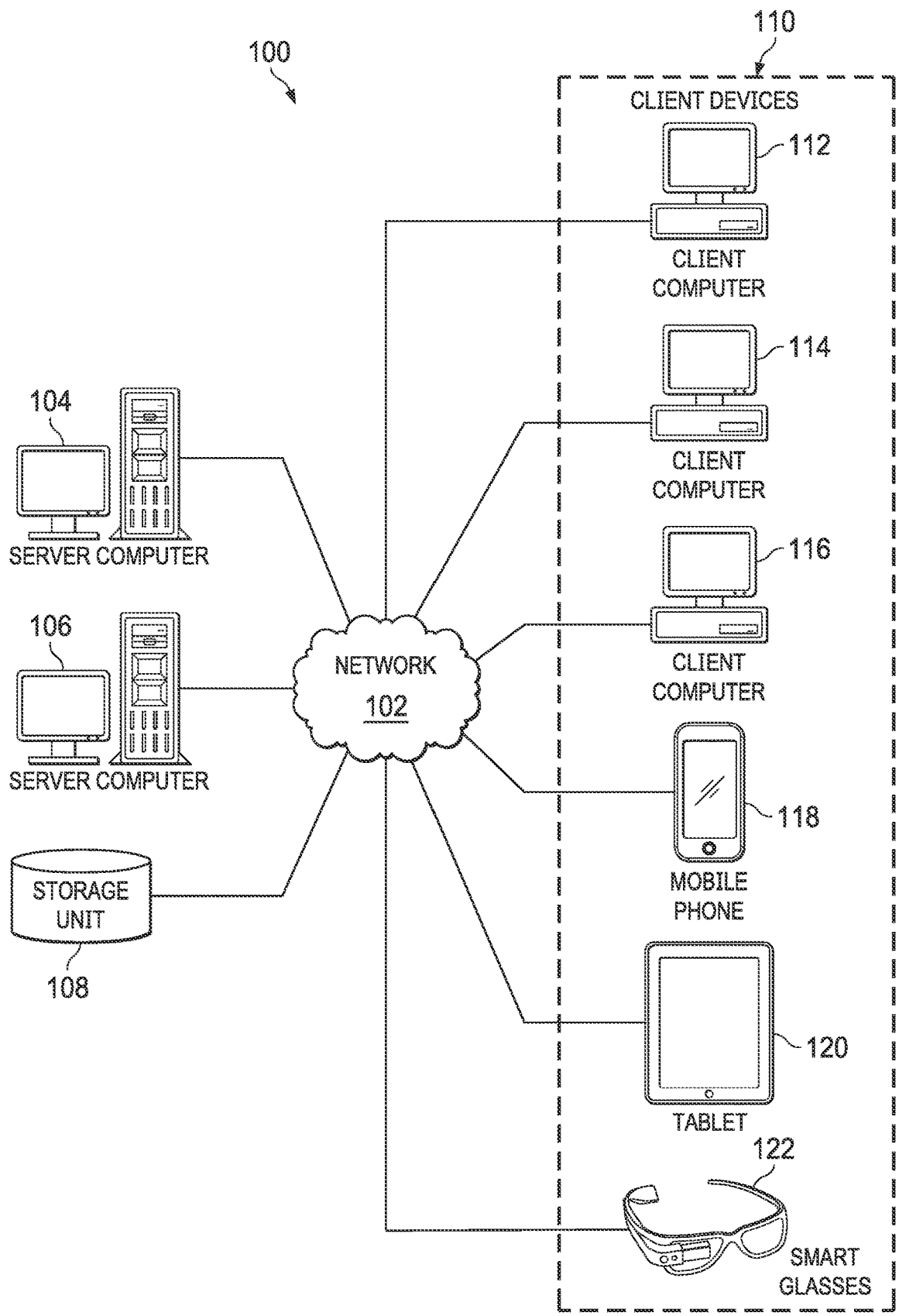
FIG. 1 is a pictorial representation of a network of data processing systems in which illustrative embodiments may be implemented.

The illustrative embodiments recognize and take into account one or more different considerations. For example, the illustrative embodiments recognize and take into account that the current market is facing rapid changes as the cloud transformation, 5G networking, work from home practices, and the Internet of Things (IoT) that are having a profound effect on network users, devices, services, and the ability for security teams and network owners to protect, detect, and respond to network threats. As the networks scale to 100 Gbps+ DPI is seen as an essential technology, which must evolve and continue to deliver visibility. As the boundaries of DPI have already been greatly expanded using advanced analytics, the technology now delivers important insights about network traffic even without inspecting the main content (or payload) of packets.

The illustrative embodiments also recognize and take into account that next generation 5G networks pose significant technical challenges as more features of the 5G 3GPP specifications are adopted by telecommunication (telco) companies. 5G core networks bring about several technical challenges, including high throughput, large number of concurrent sessions, a strong move towards commodity hardware, and utilization of software defined networking (SDN) to provide 5G network "slicing" capabilities.

The illustrative embodiments also recognize and take into account that existing DPI solutions tailored for high throughput/volume of data often cannot handle large numbers of unique sessions. Consequently, solutions tailored for handling large amounts of unique sessions often cannot maintain high throughput as keeping track of a large number of raw sessions requires a large amount of state which introduces a large obstacle to overall scalability.

The illustrative embodiments provide greater network packet visibility and packet inspection at data rates greater than 100 Gbps to secure computer network systems. The illustrative embodiments provide the ability to leverage commodity hardware (e.g., Intel x86) to enable small form factor machines to conduct 10 Gbps to a single server class system performing 100 Gbps DPI. The greater visibility and inspection enable detection of advanced content-based threats that exploit application vulnerabilities and are designed to bypass traditional security approaches such as firewalls and antivirus scanners. In addition to meeting modern network performance needs, being able to deploy a scalable software solution on commodity hardware allows for a vast application to virtually every IT network architecture with minimal capital investment. Illustrative embodiments can support 200 Gbps of network traffic and can operate on-premises or on the cloud as a software stack without any modification to hardware or custom network devices.

The DPI method of the illustrative embodiments is unique in that it is processing network traffic without the need for specific tuning around the type or overall volume of traffic. The illustrative embodiments are specifically designed to handle both of these use cases simultaneously without having to compromise one over the other.

Greater visibility and inspection are achieved through identification of the application protocol (e.g., http, SMTP, Skype) and, in some cases, extraction and processing of the information contained in the packet payload. Analysis is then performed on the resulting DPI data to identify potentially malicious behavior. Advanced DPI technologies and implementations are provided to obtain visibility and inspect the application protocol and contents at high-speed data rates.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart devices 122. Smart devices 122 might include any kind of IoT devices, e.g., smart glass (shown), camera, smart devices, smart appliance, or any kind of OT type devices, e.g., remote terminal unit (RTU), intelligent electronic device (IED), or sensors.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), an OT network, or a wide area network (WAN). FIG. 1 is intended as an example, and not as an architectural limitation for the different illustrative embodiments.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In order to realize next generation 5G architectures, telecommunication companies are rapidly adopting SDN to run network function virtualization (NFV) on top of commodity hardware. Adopting these familiar pieces of cloud architectures, allows the next generation architectures to be agile and flexible to network demands for the wide variety of 5G use cases. Modern 5G architectures are also embracing commodity x86 hardware and deploying these network functions in software, which allows for agility in the software development and deployment of large scale 5G networks enabling rapid deployment of new features and network use cases. The illustrative embodiments are unique in that they are already natively suited for this architecture. The illustrative embodiments can be deployed as a network function alongside other standard/commodity x86 5G network function applications, thereby taking advantage of the existing benefits of 5G core architectures without any new or unique hardware requirements. Not only does this ability simplify deployment, but it allows the illustrative embodiments to be used to address several security functions of a modern 5G architecture enabling advanced security features without impacting stringent 5G network performance requirements.

The illustrative embodiments provide a DPI platform that can scale to 100 Gbps on a single x86 piece of hardware. A single architecture can provide support from a single virtual switch and can span up to a single 100 Gbps interface tap.

The illustrative embodiments allow for decomposing network traffic into distinct communication sessions and load balancing for these session across all CPU cores in an equal fashion. A kernel bypass driver allows for sessionization of network traffic in user-space. This design approach allows direct access to user-space resources and applications, avoiding context switching between kernel and user-space, thereby addressing bottlenecks in prior approaches and providing scalability to achieve higher throughput DPI.

The illustrative embodiments employ a flexible architecture that is applicable to several use cases such as, small networks, traditional IT networks, Operation Technology Networks, and 5G networks. Because the illustrative embodiments can be realized on x86 instruction set architectures, they can support small form factor devices, such as, e.g., Next Unit Computing (NUC).

Figure 2:
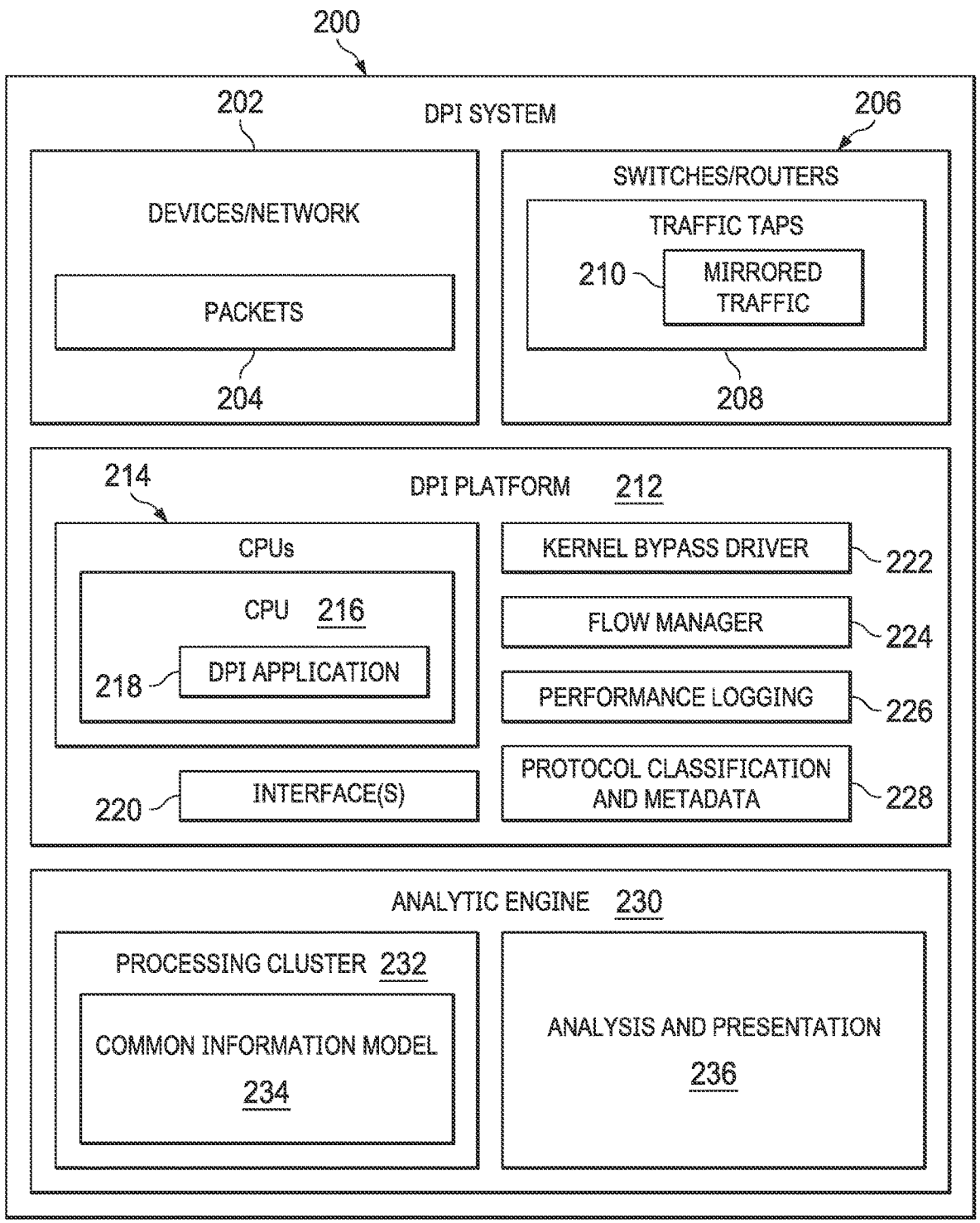
FIG. 2 depicts a block diagram of a DPI system in accordance with an illustrative embodiment.

FIG. 2 depicts a block diagram of a DPI system in accordance with an illustrative embodiment. DPI system 200 might be implemented in network data processing system 100 in FIG. 1.

DPI system 200 comprises a number of devices/network 202 that send and receive data packets 204. Switches/routers 206 provide the infrastructure and transport media (bandwidth/data rates) to transport mirrored traffic 210 from traffic taps 208 to the DPI platform(s) 216. Traffic taps 208 monitor events on devices/network 202 and copies traffic directly from the network to produce mirrored data 210. In the present example, traffic taps 208 are incorporated into switches/routers 206 but may also be located on devices/network 202.

DPI platform 212 comprises a number of interfaces 220 that provide a physical or virtual interface to the traffic taps 208. In an embodiment, interfaces 224 might comprise 1-100 Gbps bandwidth. Kernel bypass driver 222 bypasses kernel packet processing to delivery raw packets to the DPI user-space.

Flow manager 224 allows sessionization in the user-space, bypassing the kernel. This sessionization provides low-level protocol analysis to identify traffic streams. The low-level analysis may comprise Open System Interconnection (OSI) layers 2-4, i.e., data link layer, network layer, and transport layer. Flow manager 224 also provides load balancing across a number of CPUs 214 in DPI platform 212. Flow manager 224 may use CPU affinity (pinning) to deliver streams (threads) to specific CPUs among all of the CPUs 214 in the host system. Each CPU 216 runs a respective DPI application 218. Application pinning restricts DPI applications to specific CPUs to process packet streams.

DPI platform 212 produces two types of output. The first output comprises performance logging 226 of the distribution and DPI applications. The second output comprises protocol classification data and application layer metadata extraction 228.

Log aggregation and transmission/acquisition may bundle the classification/metadata 228 into a processing cluster 232, which is ingested by analytic engine 230 in real time. Analytic engine 230 may normalize classification/metadata 228 to a Common Information Model (CIM) 234. Analytic engine 230 may perform analysis and presentation 236 by using CIM 234 to correlate and query data across several different communication classifications and efficiently apply analytics to the data with the aim of feeding the queries to a Security Information and Event Management (SIEM) platform. The analysis and presentation 236 provided for the SIEM are constructed based on current cyber attack frameworks and are customizable based on the use cases and network 202 being monitored.

DPI system 200 can be implemented in software, hardware, firmware or a combination thereof. When software is used, the operations performed by DPI system 200 can be implemented in program code configured to run on hardware, such as a processor unit. When firmware is used, the operations performed by DPI system 200 can be implemented in program code and data and stored in persistent memory to run on a processor unit. When hardware is employed, the hardware may include circuits that operate to perform the operations in DPI system 200.

Previous solutions to date have largely focused on creating custom field programmable gate arrays (FPGAs) or custom ASICs. Neither of these solutions have kept up with network speeds. The technical complexity needed to implement these solutions, (such as a new protocol or new set of fields to process from a protocol), requires a computer engineer with familiarity with networking and ASIC/FPGA development. The maintenance required for this class of platforms is non-trivial. Furthermore, the solutions are not future proof. Once the technology on a programmable chip becomes outdated and no longer fits the latest protocols or standards, the cost and time of developing a new programmable network on the device is prohibitive. Thirdly, the solutions are not easily portable; the code for programmable chips is unique to that specific vendor's implementation, and there is no practical way to move the code from one chip (which may perhaps be discontinued) to another.

An alternative approach has been to deploy numerous x86 commodity hardware devices to achieve the same solution, increasing the cost of the hardware, space, power, cooling, and the maintenance of the device.

To perform deep packet inspection on a stream of network traffic, a system performs a variety of tasks, which can be implemented in either hardware or software, depending on the system configuration and capabilities. A DPI system first ingests data packets, which comprises reading incoming packets off the wire so that they can be processed by the system. Packet ingest may be performed by the Network Interface Card (NIC) which has connectivity to the high-speed data stream.

The system then performs load steering, determining which packets belong to which traffic flows. Flow steering can be performed in hardware by the NIC. In many NICs, hardware features such as RSS (Receive-Side Scaling), RPS (Receive Packet Steering), and other vendor-proprietary features can be utilized to determine, in a reasoned manner, which packets should be assigned to which flows and/or processing queues.

Alternatively, flow steering can also be performed in software on the host system, instead of utilizing the hardware NIC features. In this case, a software program on the host machine looks at every packet to determine which flow it belongs to. Software flow steering is often performed because hardware-based features may not be available, may not be flexible enough, or may consume other limited system resources (such as Hardware Interrupts).

The system next performs load balancing, wherein packets are distributed to various CPUs, CPU cores, and worker threads according to the traffic flow. Load balancing may be performed with the support of NIC hardware features, as the NIC itself may assign flows to specific queues that steer packets to various worker threads. Alternatively, load balancing may be performed purely in software, with a software program creating queues of packets in main memory and making these queues available to various worker threads.

The advantage of performing load-balancing in software is the increased flexibility of how flows are assigned to worker threads. But there is also a disadvantage in that it requires a dedicated processor core to run the software load-balancer. This dedicated processor may not be able to keep up at high throughputs. The advantage of hardware load-balancing is that the NIC has dedicated hardware for high-speed hashing of packets to assign them to worker threads. However, this hardware approach has the disadvantage of not being as flexible. Utilizing hardware load-balancing requires creating multiple NIC queues, which consume additional host processor resources such as hardware interrupts.

The worker threads may be running on the same or different CPUs and/or cores as the CPU that receives packets from the NIC. Even if hardware flow steering is utilized, the NIC is still electrically connected to a specific CPU socket even in a multi-socket system, and thus, packets must transit that CPU before arriving at the eventual destination.

Finally, the system performs flow analysis by executing worker threads to analyze the flows and perform deep packet inspecting. Flow analysis comprises the execution of the actual analysis software and algorithms on a traffic flow. The software execution for each individual flow is run on a worker thread, which is a subset of the entire set of traffic flows. The worker threads performing flow analysis operate in parallel to achieve the total aggregate throughput of the system.

By having such flexibility with how the DPI of the illustrative embodiments is deployed physically or virtually, as well as how the data is represented, an analyst can make the most use of a single product to provide visibility across a broad swath of communications networks. Three use-cases the illustrative embodiments may support include large scale, small scale, and cloud/virtual.

Figure 3:
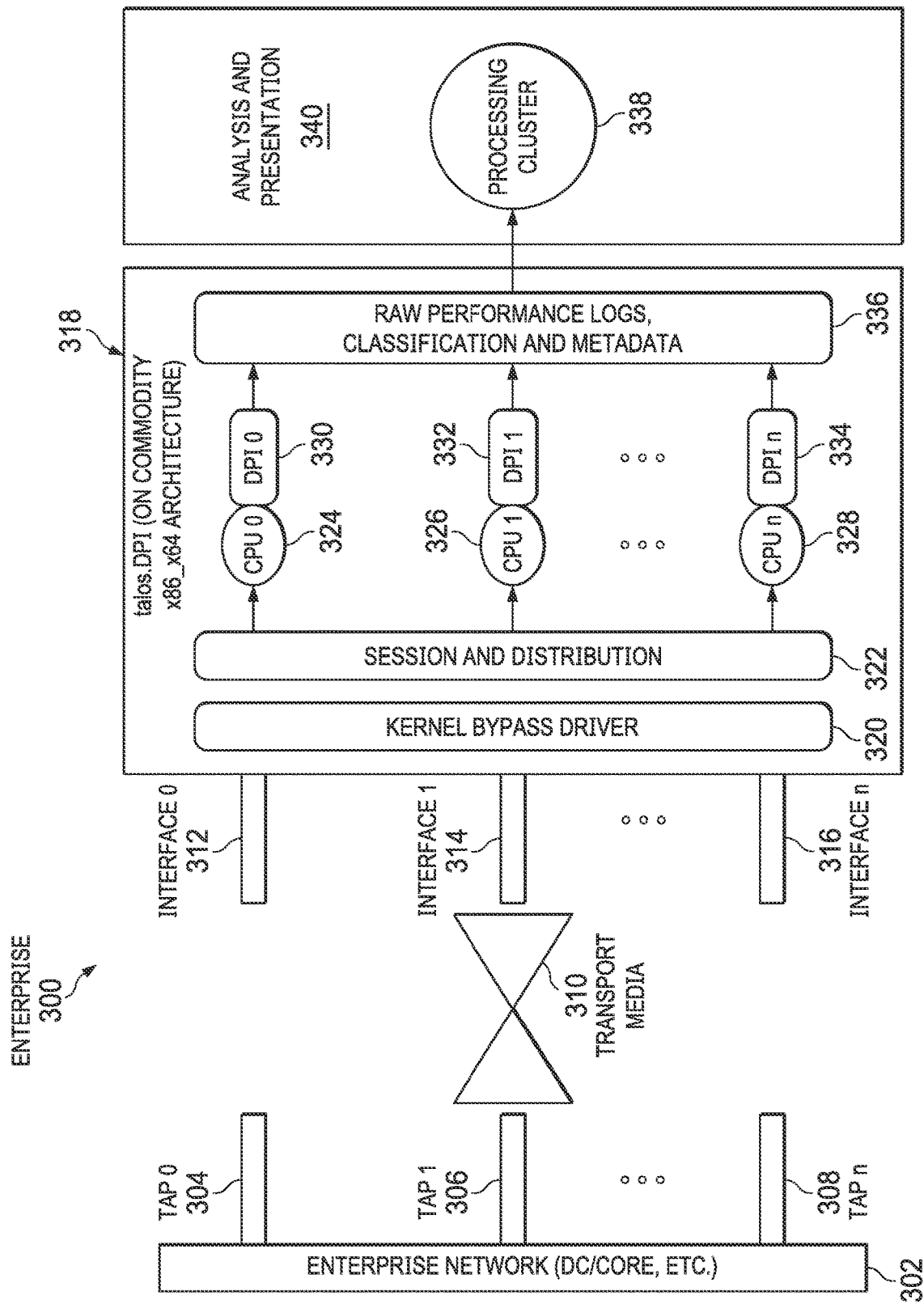
FIG. 3 depicts a block diagram of a DPI architecture for large-scale enterprise systems in accordance with an illustrative embodiment.

FIG. 3 depicts a block diagram of a DPI architecture for large-scale enterprise systems in accordance with an illustrative embodiment. Enterprise DPI architecture 300 is an example implementation of DPI system 200 in FIG. 2.

Large-scale DPI architecture 300 comprises enterprise network 302 such as, e.g., a local area network (LAN) or wide area network (WAN). Network traffic is captured, wherein copies of packets are extracted from network 302 via network taps (mirrors) 304, 306, 308. These network captures can contain one or many thousand different communications between endpoints in the network (internally and externally).

The copied packets (mirrored data flows) are sent by network taps 304, 306, 308 through a transport media 310 to physical interfaces 312, 314, 316 installed on DPI engine 318, which may comprise a commodity x86 architecture device. A kernel bypass driver 320 bypasses kernel packet processes in DPI engine 318 and is used to bridge the physical interface to user space applications.

The flow of network traffic is then consumed by flow manager 322. Flow manager 322 performs coarse-grained packet inspection at the data link, network, and transport layers of the network protocol stack by extracting the L2, L3, and L4 headers. By reading packet header contents at these layers, flow manager 320 can leverage heuristics to identify communication "conversations" between different endpoints in the data flow. These conversations, or sessions, can be extracted and further tracked in the network flow stream. Flow manager 320 distributes the identified sessions (per-flows) to a number of CPUs 324, 326, 328 (processor farm) according to the scheduling and restriction to specific CPU(s) (CPU affinity).

DPI processes 330, 332, 334 are uniquely restricted, or pinned, to respective CPUs 324, 326, 328. Each DPI process 330, 332, 334 classifies each flow according to protocol stack layers L3 (Network), L4 (Transport), L5 (Session), L6 (Presentation), and L7 (Application), collecting application layer (L7) metadata from each session, packet, or flow sample. Deeper inspection of the network traffic occurs, going beyond the transport layer protocols and into the application protocols. For example, a session identified in the lower-level Transport Control Protocol (TCP) may be passed up to classification to determine it is Hypertext Transfer Protocol (HTTP), or web traffic. At this point, DPI processes dive further into the classified data, reassembling the traffic stream at the application layer (e.g., HTTP) to actually extract information from the payload of the application. In this HTTP example, the extracted information may include information about the website visited during the HTTP session.

All the initial classification data (e.g., traffic type HTTP) and the extracted metadata extracted (e.g., HTTP web site data) are then collected 336 for ingestion into the analytic engine for the Analysis Stage 340. Performance statistics are also collected for each session from flow manager 320 and each DPI process 330, 332, 334.

Classification and metadata extraction files 336 are ingested by processing cluster 338. In the Analysis Stage 340, all classification and metadata extraction are ingested in a big-data cluster for processing. Analysis 340 begins by ingesting, in real-time, the summary classification/metadata and normalizing the data of logged events to a CIM. This CIM paves the way to correlate and query data across several different communication classifications and efficiently apply analytics to the data, with the aim of feeding the said queries to a SIEM platform. The correlation against other data sets provides context about the network traffic.

Figure 4:
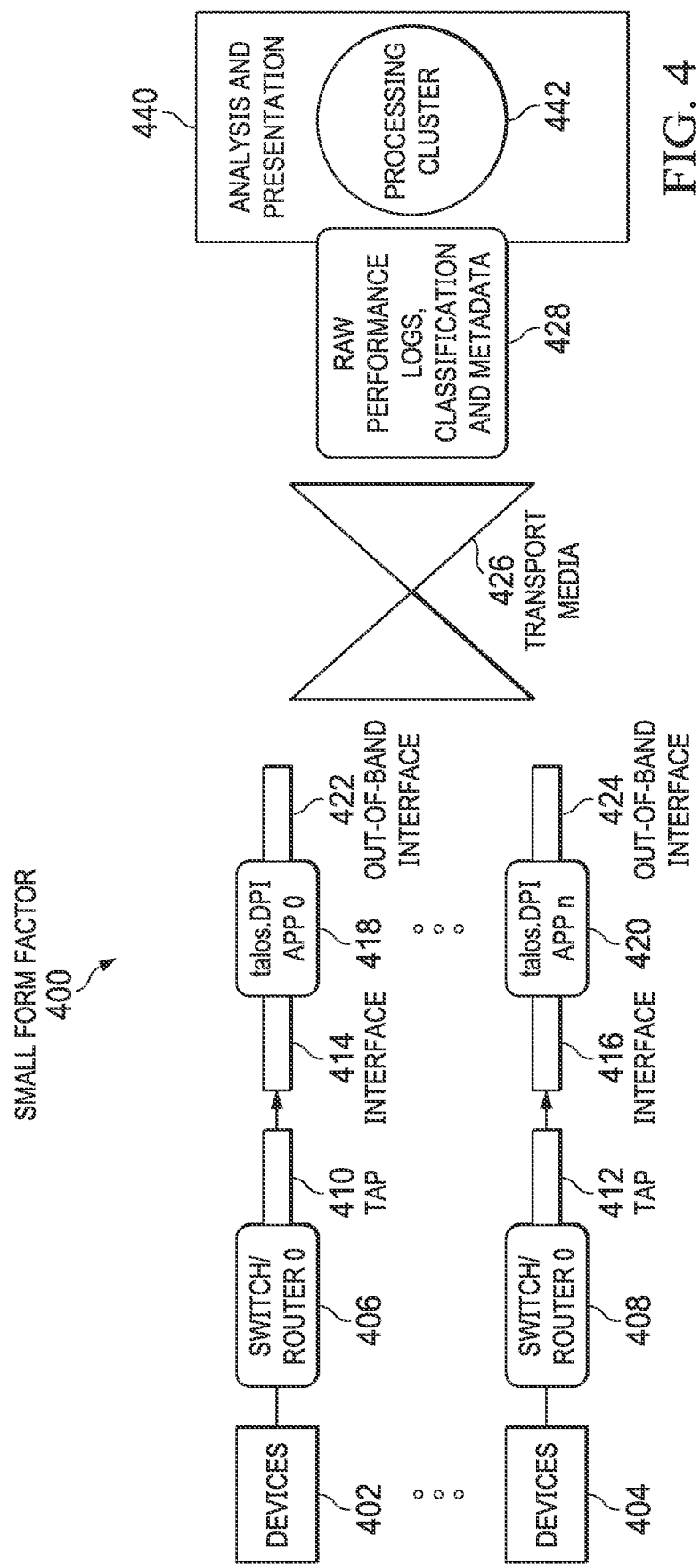
FIG. 4 depicts a block diagram of a DPI architecture for operational technology and small form factor in accordance with an illustrative embodiment.

FIG. 4 depicts a block diagram of a DPI architecture for operational technology (OT) and small form factor in accordance with an illustrative embodiment. Small scale DPI architecture 400 is another example implementation of DPI system 200.

Small scale DPI architecture 400 comprises multiple devices 402, 403, each with a respective switch/router 406, 408. Device traffic is captured, wherein copies of packets are extracted from network devices 402, 403. The mechanism that captures the packets may be network switches/routers 406, 408 or directly from the devices 402, 403.

The copied packets (mirrored data flows) are sent by traffic taps 410, 412 to respective physical interfaces 414, 416 for DPI classification engines 418, 420. In DPI architecture 400, the DPI process is applied directly to the input of the physical interfaces 414, 416 by the respective DPI engines 418, 420.

Each DPI engine 418, 420 classifies each traffic flow it receives according to OSI protocol stack layers 3-7 L3 (Network), L4 (Transport), L5 (Session), L6 (Presentation), and L7 (Application), collecting application layer metadata from the session, packet, or flow sample, similarly to PDI processes 330-334 in FIG. 3.

Classification and metadata extraction files 428 are then collected over transport media 426 from out-of-band interfaces 422, 424. Classification/metadata 428 is ingested by processing cluster 440, and logged events are normalized. Analysis Stage 340 then correlates the normalized data against other data sets provides context about the network traffic and apply analytics.

Figure 5:
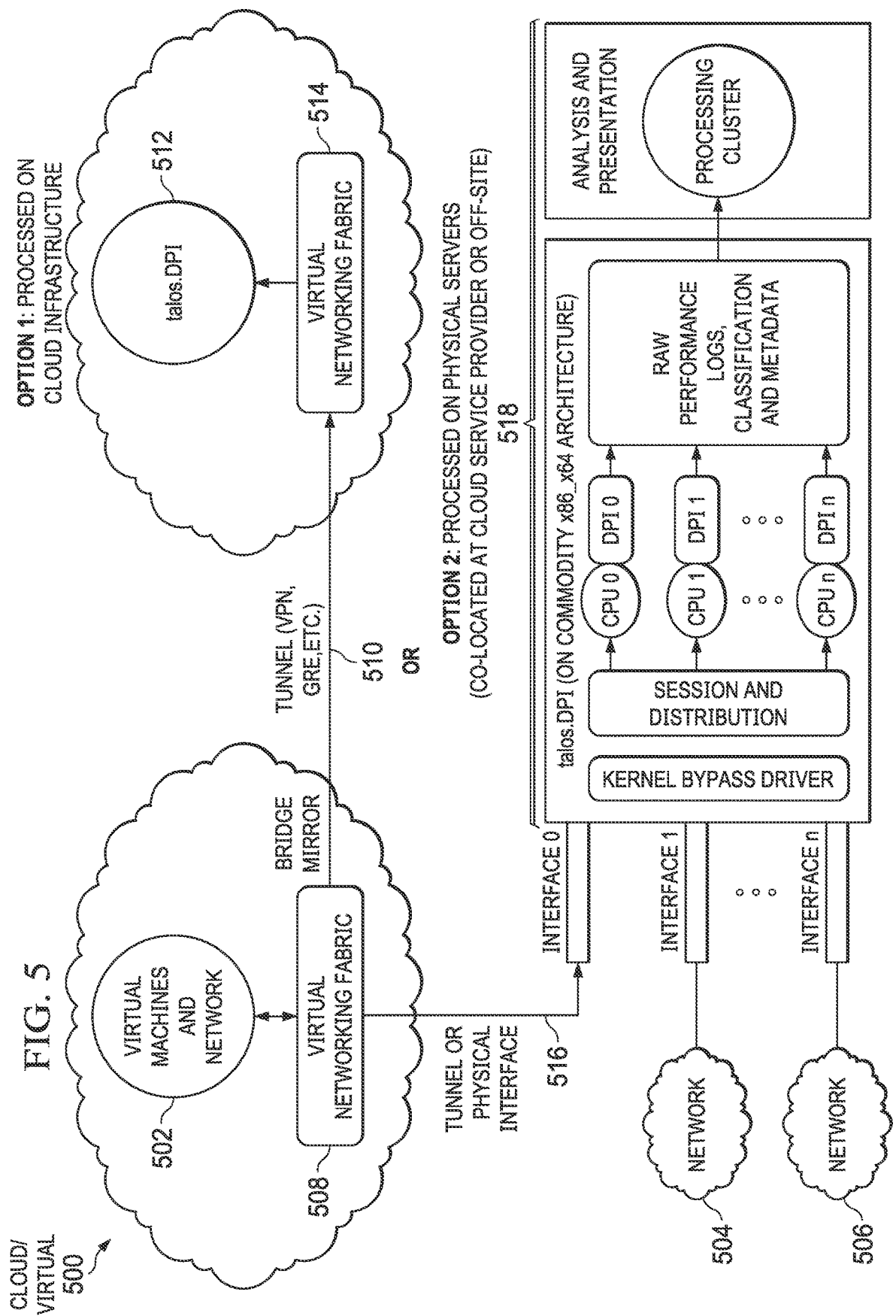
FIG. 5 depicts a block diagram of a cloud/virtual DPI architecture in accordance with an illustrative embodiment.

FIG. 5 depicts a block diagram of a cloud/virtual DPI architecture in accordance with an illustrative embodiment. Cloud/virtual DPI architecture 500 is another example implementation of DPI system 200 in FIG. 2.

Cloud/virtual DPI architecture 500 comprises a number of virtual machines and networks 502, 504, 506. Virtual interfaces from virtual machines 502 are attached to a virtual switch on the host machines. A mirror is created for all or select virtual ports on the virtual switch. Mirrored ports are then aggregated to a virtual port 508 connecter to either a virtual DPI machine 512 in the cloud or a physical DPI server 518.

Virtual DPI machine 512 runs the DPI application against received traffic on its port 514. If the mirrored traffic is processed on a cloud DPR infrastructure 512, the raw data packets are transmitted over a virtual tunnel 510 such as, e.g., a virtual private network (VPN), generic routing encapsulation (GRE), etc. Outputs are then passed to a processing cluster similar to the large-scale architecture 300 in FIG. 3.

Physical server 518 may be the cloud server itself or another server running the DPI processes. This host machine 518 then runs the DPI application against the mirrored port interfaces 516 similar to the large-scale architecture 300 in FIG. 3.

Figure 6:
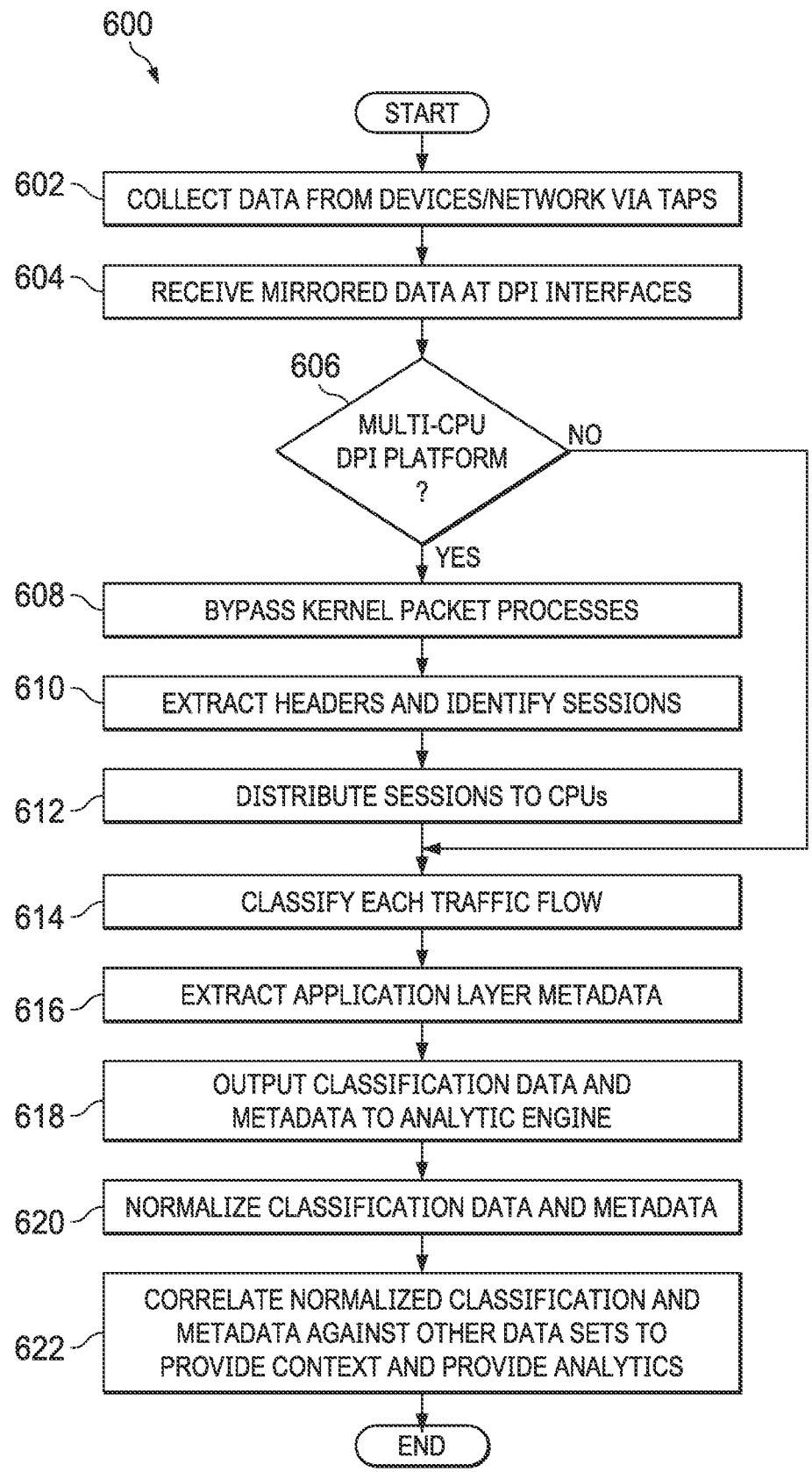
FIG. 6 depicts a flowchart illustrating a process for deep packet inspection in accordance with an illustrative embodiment.

FIG. 6 depicts a flowchart illustrating a process for deep packet inspection in accordance with an illustrative embodiment. Process 600 can be implemented in hardware, software, or both. When implemented in software, the process can take the form of program code that is run by one or more processor units located in one or more hardware devices in one or more systems. Process 600 might be implemented in network data processing system 100 in FIG. 1 and DPI system 200 in FIG. 2.

Process 600 begins by collecting data packets comprising a number of traffic flows from a number of devices/network via a number of traffic taps (step 602). The collected data packets are mirrored data. The mirrored data collected by the taps is then received by a number of DPI interfaces (step 604).

How the mirror data is subsequently handled depends on whether or not the DPI platform is a multi-CPU platform (step 606). In the case of a multi-CPU platform (i.e., large-scale), a kernel bypass drive bypasses kernel packet processes on the host system (step 608). A flow manager then extracts packet headers for network protocol layers 2, 3, and 4 to identify sessions within the traffic flows (step 610). The flow manager then distributes packets of identified sessions to respective CPUs within a number of CPUs according to CPU affinity (step 612).

Respective DPI processes pinned to each CPU then classify each traffic flow according to data about network protocol layers 3-7 of the data packets comprising the traffic flow (step 614) and extract application layer metadata from the packets (steps 616). In the case of non-multi-CPU (small scale) platforms, steps 614 and 616 are performed directly to the mirrored data received by the interfaces.

The classification data and extracted application layer metadata are ingested into data cluster in an analytic engine (step 618). The classification data and extracted application layer metadata in the data cluster are then normalized into a Common Information Model (step 620). The normalized data is then correlated against other data sets to provide context and provide analytics for threat identification (step 622). Process 600 then ends.

Figure 7:
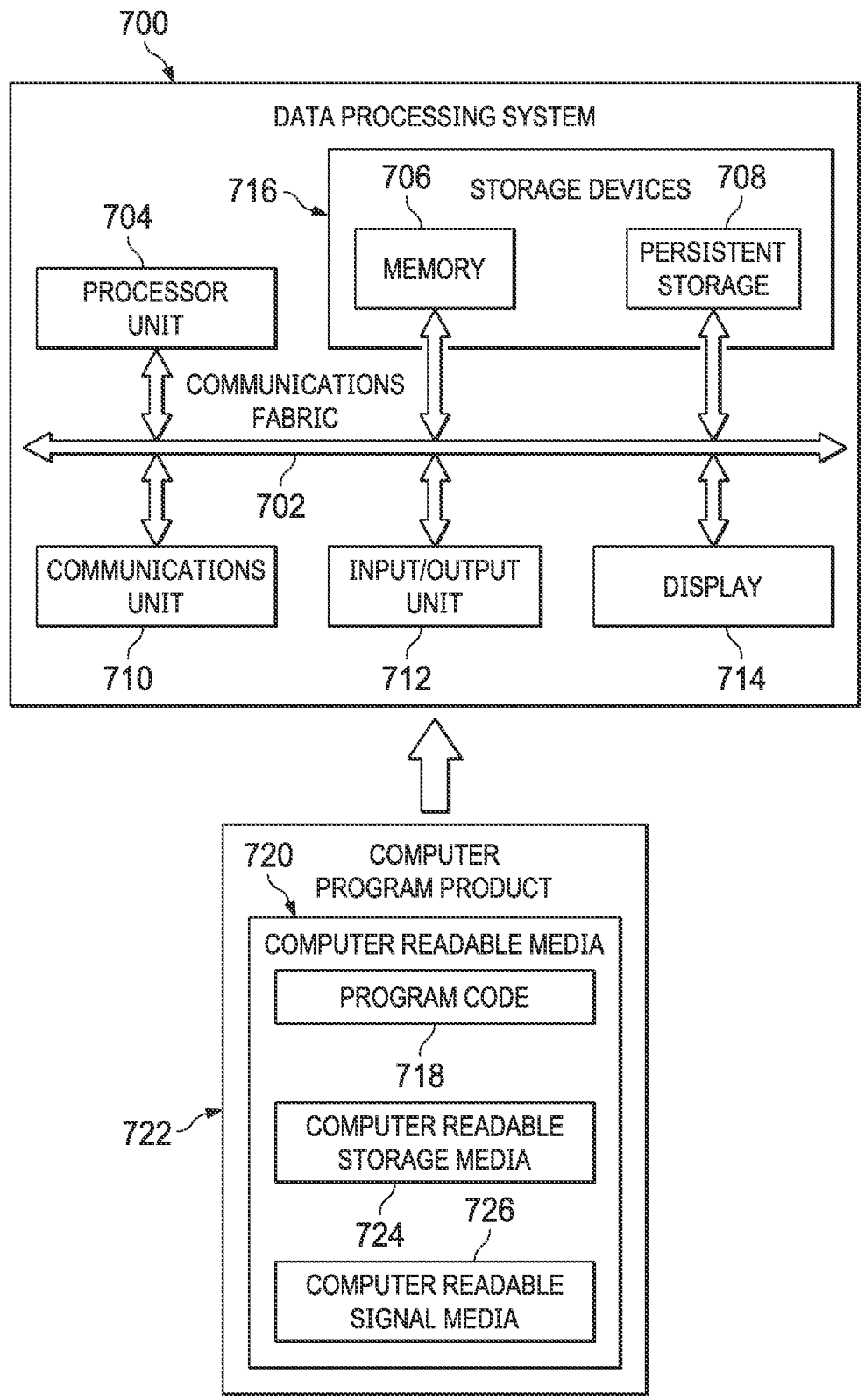
FIG. 7 is a diagram of a data processing system depicted in accordance with an illustrative embodiment.

Turning now to FIG. 7, an illustration of a block diagram of a data processing system is depicted in accordance with an illustrative embodiment. Data processing system 700 may be used to implement one or more computers shown in FIG. 1 (e.g., client devices 110 and servers 104, 106) and DPI system 200 in FIG. 2. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs). In an alternate embodiment, processor unit 704 comprises one or more graphical processing units (GPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 716, in these examples, may be, for example, a random access memory or any other suitable volatile or non-volatile storage device.

Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Computer readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 718 may be transferred to data processing system 700 using computer-readable signal media 726. Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of deep packet inspection (DPI) in a network, the method comprising:
using a number of processors to perform the steps of:
collecting all data packets on the network, the data packets comprising a number of traffic flows from a number of devices via a number of traffic taps, wherein collecting data packets comprises copying, via the number of traffic taps, collected data packets to generate mirrored data representing the number of traffic flows;
classifying mirrored data representing each traffic flow according to data about network protocol layers of the packets comprising the traffic flow, wherein classifying utilizes data about an application network protocol layer of the mirrored data to generate classification information for each traffic flow;
extracting application layer metadata from the mirrored data;
aggregating classification information for each traffic flow and extracted metadata for each traffic flow to generate a big-data cluster;
ingesting traffic flow classification data and the extracted metadata of the big-data cluster;
normalizing the big-data cluster to represent classification data and extracted metadata in a Common Information Model (CIM) form; and
correlating the normalized classification data and extracted metadata of the big-data cluster to other data sets using the CIM form of the normalized classification data and extracted metadata of the big-data cluster.

2. The method of claim 1, further comprising:
extracting packet header data from the mirrored data;
identifying sessions within the traffic flows represented by the mirrored data according to the packet header data extracted from the mirrored data; and
balancing a processing load among a number of CPUs by distributing packets of identified sessions to respective CPUs within the number of CPUs according to CPU affinity.

3. The method of claim 2, wherein the packet header data comprises network protocol data link layer, network layer, and transport layer.

4. The method of claim 2, wherein respective DPI applications are pinned to the CPUs.

5. The method of claim 1, wherein the traffic flows are classified according to network protocol layers including: network, transport, session, presentation, and application network protocol layers.

6. The method of claim 1, wherein the devices comprise physical devices on a network.

7. The method of claim 1, wherein the devices comprise virtual devices in a cloud.

8. The method of claim 7, wherein the collected data is received by a physical server through a number of physical interfaces.

9. The method of claim 7, wherein the collected data is received by a virtual machine through a virtual tunnel.

10. A system for deep packet inspection (DPI) in a network, the system comprising:
a storage device configured to store program instructions; and
one or more processors operably connected to the storage device and configured to execute the program instructions to cause the system to:
collect all data packets on the network, the data packets comprising a number of traffic flows from a number of devices via a number of traffic taps, wherein collecting data packets comprises copying, via the number of traffic taps, collected data packets to generate mirrored data representing the number of traffic flows;
classify mirrored data representing each traffic flow according to data about network protocol layers of the packets comprising the traffic flow, wherein classifying utilizes data about an application network protocol layer of the mirrored data to generate classification information for each traffic flow;
extract application layer metadata from the mirrored data;
aggregating classification information for each traffic flow and extracted metadata for each traffic flow to generate a big-data cluster;
ingest traffic flow classification data and the extracted metadata of the big-data cluster;
normalize the big-data cluster to represent classification data and extracted metadata in a Common Information Model (CIM) form; and
correlate the normalized classification data and extracted metadata of the big-data cluster to other data sets using the CIM form of the normalized classification data and extracted metadata of the big-data cluster.

11. The system of claim 10, wherein the processors further execute instructions to:
extract packet header data from the mirrored data;
identify sessions within the traffic flows represented by the mirrored data according to the packet header data extracted from the mirrored data; and
balancing a processing load among a number of CPUs by distribute packets of identified sessions to respective CPUs within the number of CPUs according to CPU affinity.

12. The system of claim 11, wherein the packet header data comprises network protocol data link layer, network layer, and transport layer.

13. The system of claim 11, wherein respective DPI applications are pinned to the CPUs.

14. The system of claim 10, wherein the traffic flows are classified according to network protocol layers including: network, transport, session, presentation, and application network protocol layers.

15. The system of claim 10, wherein the devices comprise physical devices on a network.

16. The system of claim 10, wherein the devices comprise virtual devices in a cloud.

17. The system of claim 16, wherein the collected data is received by a physical server through a number of physical interfaces.

18. The system of claim 16, wherein the collected data is received by a virtual machine through a virtual tunnel.

19. A computer program product for deep packet inspection (DPI) in a network, the computer program product comprising:
a computer-readable storage medium having program instructions embodied thereon to perform the steps of:
collecting all data packets on the network, the data packets comprising a number of traffic flows from a number of devices via a number of traffic taps, wherein collecting data packets comprises copying, via the number of traffic taps, collected data packets to generate mirrored data representing the number of traffic flows;

classifying mirrored data representing each traffic flow according to data about network protocol layers of the packets comprising the traffic flow, wherein classifying utilizes data about an application network protocol layer of the mirrored data to generate classification information for each traffic flow;

extracting application layer metadata from the mirrored data;

aggregating classification information for each traffic flow and extracted metadata for each traffic flow to generate a big-data cluster;

ingesting traffic flow classification data and the extracted metadata of the big-data cluster;

normalizing the big-data cluster to represent classification data and extracted metadata in a Common Information Model (CIM) form; and correlating the normalized classification data and extracted metadata to other data sets using the CIM form of the normalized classification data and extracted metadata of the big-data cluster.

20. The computer program product of claim 19, further comprising instructions for:

extracting packet header data from the mirrored data;

identifying sessions within the traffic flows represented by the mirrored data according to the packet header data extracted from the mirrored data; and balancing a processing load among a number of CPUs by distributing packets of identified sessions to respective CPUs within the number of CPUs according to CPU affinity.

21. The computer program product of claim 20, wherein the packet header data comprises network protocol data link layer, network layer, and transport layer.

22. The computer program product of claim 20, wherein respective DPI applications are pinned to the CPUs.

23. The computer program product of claim 19, wherein the traffic flows are classified according to network protocol layers including: network, transport, session, presentation, and application network protocol layers.

24. The computer program product of claim 19, wherein the devices comprise physical devices on a network.

25. The computer program product of claim 19, wherein the devices comprise virtual devices in a cloud.

26. The computer program product of claim 25, wherein the collected data is received by a physical server through a number of physical interfaces.

27. The computer program product of claim 25, wherein the collected data is received by a virtual machine through a virtual tunnel.

* * * * *